Aug. 27, 1957 S. N. COATES 2,804,534
HOT WATER HEATER
Filed Nov. 26, 1956

INVENTOR.
SYDNEY N. COATES
BY Reynolds, Beach &
Christensen
ATTORNEYS

United States Patent Office 2,804,534
Patented Aug. 27, 1957

2,804,534

HOT WATER HEATER

Sydney N. Coates, Seattle, Wash.

Application November 26, 1956, Serial No. 624,407

5 Claims. (Cl. 219—38)

The hot water heater of the present invention is designed to contain a large total volume of water, but to heat only a relatively small part of that total volume, with comparative rapidity, and to make that small fully heated volume available for occasional and small withdrawals, but by segregating that small volume from the remainder of the total volume the entire volume need not be heated to maximum temperature except when the withdrawal is in such volume as to require additional heating, and then only serially as the cooler water replaces the withdrawn hot water. At the same time, the accumulation of stagnant hot water, which may scald a user upon opening a valve, is avoided. In consequence, there is a saving of power, yet without sacrifice of adequate volumes of thoroughly heated but not scalding water ready for use as and when needed.

These objectives are attained by a rearrangement of the cold water inlet and the hot water outlet and by the provision of a relatively small and desirably heat-insulated segregating chamber within an open to the entire mass of water within the tank, but capable of segregating and containing indefinitely a small volume of the total for heating, and of delivering the so-heated water when needed directly to the hot water outlet, without appreciable mingling thereof with the remainder of the volume in the tank, and without the cooling of the segregated volume of hot water by such inlet of cold water as occurs to replace withdrawn hot water. Provision may also be made for restricting more, or less, the escape of hot water from this chamber, yet sufficient freedom of circulation is attained that no pocket of superheated water can collect, to be discharged as steam or scalding water.

In the accompanying drawings the invention is shown embodied in a typical structure arranged to accomplish the ends above, and the constructional principles which distinguish the present invention will be set forth in the appended claims.

Figure 1:
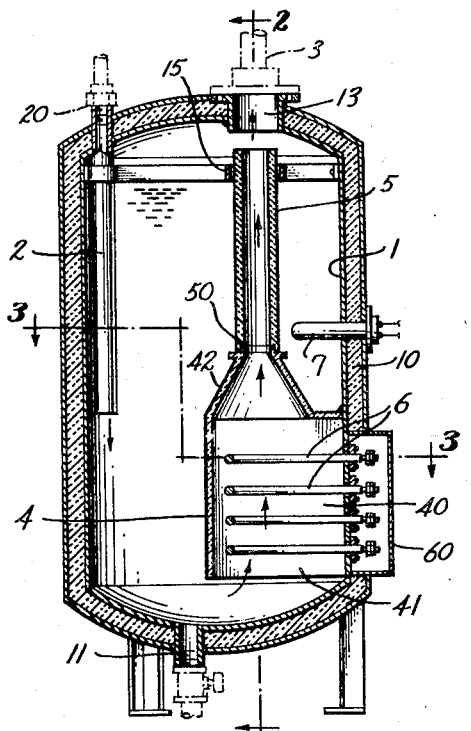
Figure 1 is an axial sectional view through the hot water tank of this invention.
Figure 2:
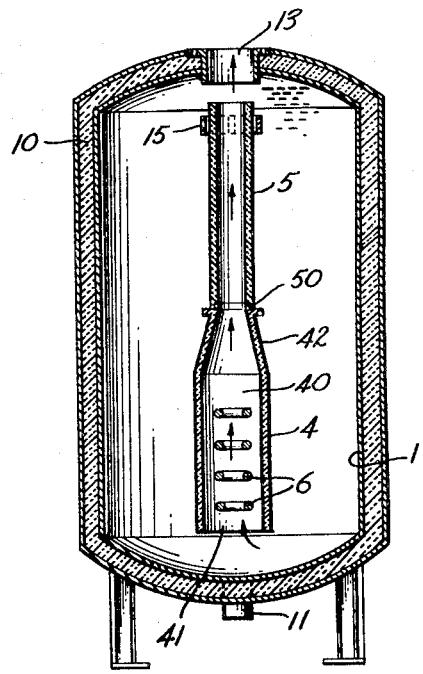
Figure 2 is a similar view but from a viewpoint ninety degrees removed from the viewpoint of Figure 1, as shown at line 2—2 of Figure 1.
Figure 3:
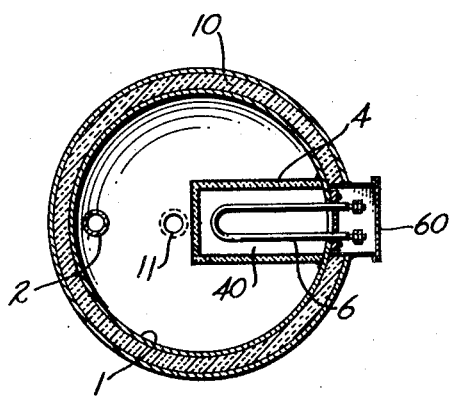
Figure 3 is a cross-sectional view through the tank, substantially as indicated at the line 3—3 of Figure 1.

The main tank 1 is of normal construction and of any suitable size and shape. Heat insulation 10 is provided about its walls and preferably also about its top and bottom. It would normally be provided with a drain nipple 11, and cold water is admitted through a connection at 20 constituting the upper end of a conduit 2 which projects into the tank, preferably through the top, and thence downwardly. Hot water is withdrawn through a connection 3 to an enlarged opening, defined by a collar 13 let into the top of the tank. The cold water inlet conduit 2 and the collar at 13 for outlet of hot water are widely separated laterally as well as vertically.

Within its interior the tank 1 is provided with a housing 4 defining a chamber 40 of relatively small volume. This chamber is closed at its sides and at its top, but its bottom at 41 is freely open to the interior of the tank 1, at a level near the bottom of the latter. Preferably this housing 4 is insulated, and it is located laterally as far distant as is convenient from the cold water inlet conduit 2.

There is an opening provided at the top of the chamber 40, as defined by the inverted funnel 42, located in vertical alignment with the collar 13. The collar 13 is preferably sufficiently large to admit a chimney 5, the lower end of which, at 50 interfits with the upper end of the funnel 42 by relative axial movement so that it may not be displaced therefrom laterally, and the chimney may be further steadied at its upper end by an encircling ring 15 supported within the tank 1 near its top. Preferably the chimney 5 is also heat-insulated. The upper end of the chimney terminates short of the top of the tank 1, so that it is adjacent the top but in free communication with the interior of the tank 1.

The housing 4, being located desirably adjacent one side of the tank 1, which side constitutes a side of the tank 1, is provided with openings for the admission and installation of heating elements 6, which may be of the electric-immersion type, and these are housed in by the shield 60. Desirably several such elements are employed, of an aggregate capacity adequate to heat water to the desired maximum temperature about as fast as the water can be drawn off. The several elements 6 are directed horizontally, one immediately above the other, so that their heating effect is cumulative on the small volume rising within the chamber 40.

It will be noted that the cold water inlet conduit 2 terminates vertically well above the bottom entrance 41 to the chamber 40 and well below the upper end of the chimney 5.

Assuming the tank 1 to be filled with cold water, upon energization of the heating elements 6 the water within the chamber 40 will quickly be heated to a maximum temperature, such as is readily controlled by an aquastat or thermostat 7 such as is commonly used in such installations. This hot water will tend to rise, being lighter than the cold water, and yet its upward flow is somewhat restricted by the narrowing down of the funnel 42 and chimney 5. It will rise to the top of the tank 1 and then will stratify, displacing downwardly a portion of the cold water, but on the whole mingling but slightly, and very slowly, with the colder strata below the upper end of the chimney. Eventually, assuming there is no withdrawal of hot water, conditions will stabilize. The hot water, confined in the chamber 40, and restricted in its upward flow in the manner indicated, will soon reach a temperature at which the larger volume within the tank 1, heated to a much lesser degree than the volume within the chamber 40, will cause the aquastat 7 to de-energize the heating elements 6, but the hot water at the top of the tank will not tend to heat the water below the top of the chimney 5 to any temperature approaching that of the volume within the chamber 40. The large mass of water in the tank will therefore be relatively cool. Whenever hot water is required, it is withdrawn through the conduit 3 and is drawn in effect directly from the chimney 5. So much of the cooler water from the mass within the tank 1 proper as is required to replace the withdrawn hot water flows in at 41. It comes primarily from inflow by way of 2, and the stratification between hot and cold water in the upper part of the tank is but little disturbed. The inflowing cold water will promptly be heated by the heating elements 6, but again conditions will stabilize, and only so much cold water will be heated, approximately, as is required to replace the withdrawn hot water.

Should there be any need for extensive withdrawal of hot water there will be continuous heating of the cold water, but always, since the cold water inlet is at a level intermediate the top of the chimney 5 and the bottom 41 of the chamber 40, there will be a large mass of cool or cold water within the tank, and only the relatively small volume passing through the chamber 40 will be heated, but this will be heated with sufficient rapidity and to such a temperature as to fulfill most requirements.

Because the greater volume of the water within the tank 1 is always relatively cool, there will be minimum loss of heat through the walls of the tank 1. Furthermore, since the housing 4 and chimney 5 are preferably heat insulated, there will be no large loss of heat through these walls and so into the larger mass of water within the tank 1.

Since the chamber 4 is freely open at its bottom, there can never by any restriction on inflow thereto of cold water, other than such as is imposed by stratification within the tank. The top of the chimney 5 is open unobstructedly to the volume within the tank, hence no pocket exists wherein hot water may collect and become superheated, to scald the user who opens a valve. Rather, any highly heated water escapes from the chimney into the tank, is cooled somewhat by the large volume of water therein, and if the top of the tank becomes filled with water of maximum temperature, the thermostat 7 cuts off current to the heating elements 6.

Figure 4:
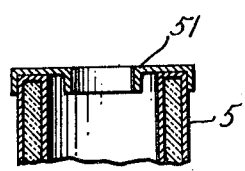
Figure 4 is an enlarged sectional view of an optional refinement.

Should it be desired to restrict more greatly outflow of hot water from the top of the chimney, and its commingling with the cooler water, either the chimney 5 can be withdrawn and replaced by a chimney of lesser internal diameter, or an orifice plate 51, as shown in Figure 4, can be inserted through the opening 13, to rest upon the top of the chimney 5.

The horizontal disposition of the heating elements 6, one above another, best promotes efficiency, and permits the use of standard elements, without deformation thereof. It simplifies removal and replacement of such elements, when required.

A safety aquastat may be installed to cut off current to the heating elements in the event of overheating, but since such a safety device is common in the art, it has not been illustrated.

I claim as my invention:

1. A hot water heater comprising a tank, a chamber therein closed at its sides but unobstructedly open at its bottom, above the bottom of the tank, for unobstructed intake of cool water from within the tank, and having an opening in its top, electric heating elements penetrating the side of the tank and disposed horizontally within said chamber, a chimney of reduced section relative to the chamber's rising from the top opening of said chamber to the vicinity of the tank's top, for discharge of hot water directly into the tank, said tank having a hot water outlet in general vertical alignment with the upper end of said chimney, and said tank having also a cold water inlet located vertically generally midway between the open bottom of the chamber and the top of the chimney, and laterally offset from said chamber.

2. A hot water heater as in claim 1, wherein the chimney is separable from and in use rests upon the chamber, the hot water outlet being of sufficiently large size to pass said chimney.

3. A hot water heater as in claim 2, wherein the chamber, surrounding its top opening, and the chimney at its lower end, are formed to interfit by relative axial movement alone, and means within the tank to support and immobilize the upper end of said chimney.

4. A hot water heater as in claim 1, including additionally an orifice plate of a size for insertion through the hot water outlet, and in use resting upon the top of the chimney to restrict thermally induced rising of hot water from the chamber through the chimney.

5. A hot water heater comprising a tank, a chamber therein projecting inwardly from a side wall of the tank, and closed at its sides but freely open at its bottom, and having a restricted opening in its top, vertically aligned electric heating elements projecting horizontally within said chamber from the tank's wall, a chimney separable from said chamber by relative axial movement, alone, and resting by gravity upon the top of said chamber, surrounding said opening, and rising thence to a point adjacent the top of the tank, for free discharge directly into the tank, the tank having a hot water outlet in its top, in vertical alignment with but spaced above the upper end of the chimney, and of a size to permit passage of said chimney, and a cold water inlet conduit extending into said tank to a discharge point located vertically well above the open bottom of the chamber and below the top of the chimney and offset laterally from said chamber.

References Cited in the file of this patent

UNITED STATES PATENTS

| | | |
|---|---|---|
| 1,034,952 | Ball | Aug. 6, 1912 |
| 1,916,066 | Moyle | June 27, 1933 |
| 2,411,675 | Alexander | Nov. 26, 1946 |
| 2,576,603 | Hines et al. | Nov. 27, 1951 |
| 2,784,291 | Harney | Mar. 5, 1957 |